(12) United States Patent
Cao

(10) Patent No.: US 7,892,579 B2
(45) Date of Patent: Feb. 22, 2011

(54) PLANT EXTRACTION USING NONLINEAR VIBRATION

(76) Inventor: Peisheng Cao, Room 1208, No. 70, Yong Xing Small Road, Shanghai (CN) 200070

( * ) Notice: Subject to any disclaimer, the term of this patent is extended or adjusted under 35 U.S.C. 154(b) by 0 days.

(21) Appl. No.: 10/580,061

(22) PCT Filed: Mar. 2, 2004

(86) PCT No.: PCT/CN2004/000161

§ 371 (c)(1),
(2), (4) Date: Feb. 20, 2007

(87) PCT Pub. No.: WO2005/056155

PCT Pub. Date: Jun. 23, 2005

(65) Prior Publication Data

US 2007/0154571 A1   Jul. 5, 2007

(30) Foreign Application Priority Data

Dec. 8, 2003   (CN) .......................... 2003 1 0118249

(51) Int. Cl.
*A61K 36/00*   (2006.01)
(52) U.S. Cl. .................................................. 424/725
(58) Field of Classification Search ...................... None
See application file for complete search history.

(56) References Cited

U.S. PATENT DOCUMENTS

| | | | | |
|---|---|---|---|---|
| 4,018,755 A * | 4/1977 | Wang | ....................... | 530/378 |
| 4,064,277 A * | 12/1977 | Yokotsuka et al. | .......... | 426/331 |
| 4,749,891 A | 6/1988 | Sheng | | |
| 5,902,224 A * | 5/1999 | Bloom | ....................... | 494/25 |
| 6,313,273 B1 * | 11/2001 | Thomas et al. | .............. | 530/378 |
| 6,352,644 B1 | 3/2002 | Hawthorne et al. | | |
| 6,656,436 B1 | 12/2003 | Sentagnes et al. | | |
| 6,706,180 B2 * | 3/2004 | Kirker et al. | ................. | 210/232 |
| 2002/0009506 A1 * | 1/2002 | Tao | ........................... | 424/728 |

| | | | |
|---|---|---|---|
| 2003/0183043 A1 | 10/2003 | Wai et al. | |

FOREIGN PATENT DOCUMENTS

| | | |
|---|---|---|
| CN | 85 1 02855 | 4/1985 |
| CN | 1172669 A | 2/1998 |
| CN | 1228432 A | 9/1999 |
| CN | 1435270 A | 8/2003 |
| GB | 2 004 197 A | 3/1979 |
| JP | 62-194436 | 8/1987 |

OTHER PUBLICATIONS

Sonneau, P.: Dui Yao the Art of Combining Chinese Medicinals; Blue Poppy Press, Boulder, CO, 1999.*
Li et al. "The improvement and influence of ultrasonic and microwave irradiation on the extraction of traditional Chinese medicine" Chemical Research and Application vol. 14, No. 3 Jun. 2002. pp. 245-249.
Zhu et al. "Strong acoustic nonlinearity of bubbly liquids" Acta Acustica, vol. 20, No. 6, Nov. 1995, p. 425-431.

* cited by examiner

*Primary Examiner*—Patricia Leith
(74) *Attorney, Agent, or Firm*—Merchant & Gould P.C.

(57) ABSTRACT

The invention discloses an extraction method and the apparatus thereof. The method according to the invention comprises the following steps: crushing and soaking the raw material, and then extracting, wherein the extracting step is carried out under a 18-33 kHz nonlinear vibration, using water as solvent, under 25-35 MPa pressure and at 0-50° C. temperature, thus obtaining a extract which contains the active components of the raw material. The method according to the invention also provides an apparatus for the nonlinear critical extraction. The applications of the method and apparatus according to the invention allow to extract the Chinese traditional medicines and plants at room temperature, thus not only ensuring the biological activity of the components in the medicines and plants, but achieving the substantial full-composition extraction of the Chinese traditional medicine and plants, as well as overcoming the disadvantages of the extract technology in the prior art which would destroy or partially extract the biological activities of partial components. Therefore, the method and apparatus of the invention can be widely used in the fields such as the Chinese traditional medicines, chemical engineering, food, etc.

18 Claims, 14 Drawing Sheets

PLANT EXTRACTION USING NONLINEAR VIBRATION

TECHNICAL FIELD

This invention relates to an extraction method and the apparatus thereof, especially to an extraction method and the apparatus thereof utilizing the principle of nonlinear vibration and critical extraction, which can be used in the extraction of Chinese traditional medicines and plants.

BACKGROUND ART

Chinese traditional medicines are traditionally used in China, and there is a historically long time in China using Chinese traditional medicines to treat patients. The World Health Organization also recommends using Chinese traditional medicines, thus with the hope that people can get the Chinese traditional medicines with safety, high efficiency, speed and convenience. However, because the production processes of Chinese traditional medicines, especially the extraction and separation drop behind relatively, it is hard to achieve the standardization and criterion of the quality control. It is always difficult to register, sell and use Chinese traditional medicines legally in the world market.

In recent years, the modern equipments such as stainless steel multi-functional cans, external-circulating vaporization, multi-purpose vaporizer, fluid dryer etc. are used in the traditional production of Chinese traditional medicines. There is also some progress in the preparation of Chinese traditional medicines, such as the preparations of granule, tablet, capsule and oral solution. However, in general, the extraction process of Chinese traditional medicines is substantially still "All-In-One-Container" decocting, or rough extracting using water and ethanol under high temperatures (above 95° C.) (i.e. "water extracting" or "alcohol extracting"), or the additional low temperature drying and super fine combination. There are many disadvantages with the prior arts. This kind of Chinese traditional medicines production method, lacking the scientific and strict processing manipulation parameters, is of high energy consumption and low efficiency. Because high temperature is necessary for extracting, parts of the active substance in the medicine are destroyed, only partial effective component is extracted, and the rest of effective component are destroyed, lost and abandoned as remaining in the residua during the course of production. This affects the extracting ratio of Chinese traditional medicines, causes environmental pollution, leads to the instability of curative effect, the bad taste and color of the production and the internally instability in quality, among other things. Thus, in the course of research development and industrialization, the technology of Supercritical Fluid Extraction occurred, especially the new technology used in the aspect of medicine extraction and purification. The course of supercritical fluid dissolving and extracting the substance is named as Supercritical Fluid Extraction (with the abbreviation of SFE hereinafter). Generally, $CO_2$ is preferably used in supercritical extraction, and the basic principle is that the critical temperature (Tc) of $CO_2$ is 31.05° C., and the critical pressure (Pc) of $CO_2$ is 7.98 MPa, and when they are over critical point, $CO_2$ will exhibit the dual characters of a gas and a liquid. It is similar to a gas in its viscosity, and it is similar to liquid in its density. It is an excellent solvent which will dissolve many substances through the interaction and diffusion within the molecules. Meanwhile, in the range slightly above the critical point, the slight change in pressure will cause notable change in the density; thereby the solubility will change greatly. The supercritical $CO_2$ may dissolve the substance out from the medium, thus forming the supercritical $CO_2$ loading phase, and reduce the pressure or increase the temperature-so the solubility of supercritical $CO_2$ will reduce. These substances will precipitate out to separate from the $CO_2$, thereby achieving the target of extracting and separation. Because different substances will have different solubility in $CO_2$, and even the same substance will have different solubility under different pressure and temperature, this makes the extraction method have relatively high selectivity.

However, supercritical $CO_2$ extraction also has disadvantages hard to overcome. First, the cost of such extraction method is relatively high. Because $CO_2$ works under the supercritical situation, it is necessary to use high-powered air compressors to carry out the compressing cycle to the $CO_2$ gas. This will last the whole process of extraction, and results in high electric power consumption and high cost. Second, gases always are dangerous under high pressure, which causes the problem of manipulation safety. Third, the solubility of supercritical $CO_2$ is not as big as the liquid solubility, which makes the production efficiency relatively low. Finally, supercritical critical extraction is more suitable for the extraction of single component, but can not ensure the extraction of wholly single component, so it is not suitable for the extraction of full-components from Chinese traditional medicine or plants.

In recent investigation of the effective components of Chinese traditional medicine and the related plants, it is found that the rough extracts from these Chinese traditional medicines are much better than a pure component in the aspects of bioactivity and less toxicity. For example, Japanese researcher Akihiko Satou et al., in the course of using the Hela cancer cell to select the activity of anticancer of Chinese traditional medicine, found that some types of extraction with the activity of anticancer will have higher activity and higher toxicity when the purity is higher, while another type of extraction with very high activity and no toxicity, will have lower activity when the purity is higher. Another example is the extraction of devil-pepper, which will have no adverse effects such as depression as caused by Reserpine when used for a long time. All of the above samples demonstrate that a bioactive guide is obtained through the cooperation of many components with each other. Thus, the traditional extracting methods under high temperature, whether using water or alcohol, will always partially destroy original active substances in the medicines, and may cause the generation of some toxic adverse effects. However, the technology of supercritical extraction cannot ensure extracting a pure single component or carrying out the extraction of full-components.

Based on the above description, considering the severe backwardness and deficiency existing in the technology of extracting effective functional components from Chinese traditional medicine or related plants, it will have important theoretic and practical significance, in the aspect of extracting the substantial full-components from Chinese traditional medicine, plants or other material, to investigate and develop a new method protecting the effective components in the Chinese traditional medicine and plants from being lost and destroyed, which will also ensure the extraction of substantial full-components.

SUMMARY OF THE INVENTION

The object of present invention is to provide a method for extracting, which can extract the Chinese traditional medicine or plants, not only ensuring the bioactivity of the components in the medicines and plants, but achieving the substantial full-composition extraction of the Chinese traditional medicine and plants as well as overcoming the disadvantages of the extract technology in the prior art which would destroy or partially extract the biological activities of partial components. The method can be widely used in the fields such as the Chinese traditional medicines, chemical engineering, food, etc.

The inventor has spent many years of investigation on nonlinear vibration, and has disclosed, in Chinese patent application 85102855, the investigation of the principle and application equipments of nonlinear vibration. The method according to the present invention uses nonlinear vibration critical extraction to promote the dissolving and emulsification of the substance in water. Its basic principle is that the water will be in the critical situation, under a certain pressure, and the nonlinear vibration equipment will make the water generate waves with different frequency and different swing. Because water will have a different absorbing degree for different substances under different frequencies, the water at this time can dissolve different substances in high degree. It not only dissolves the water-soluble substances, but also promotes the emulsification of fat-soluble substances, which thereby can be extracted. The frequency range of 18~33 kHz used in the present invention can extract substantial full-components of the raw materials, and thus can be used in the extraction of many types of raw materials including Chinese traditional medicine (including the animal based medicine) and plants. It has a very wide application range. Thus the method according to the present invention can be used to produce the preparation and troche to achieve the standardization and criterion of Chinese traditional medicine. The method can also be used to extract the juice from plants and the extraction of animal effective components, which is related to industries such as Chinese traditional medicine, health-care products, food and cosmetics, and thus has important and practical application values.

The method according to the present invention carries out the extraction under high pressure through making the water in critical situation. The pressure during the extraction may be stabilized, or may vary in a certain range. In one aspect, high pressure is favorable to break the substances wall, making the substances easy to resolve. In another, it can be understood from the prior art that when the water is in the near critical situation, four water molecules aggregate to form a two-cycle octamer, and the two-cycle octamers can further aggregate to form a water group of 280-molecule icosahedron with high symmetry. They can be linked cycle by cycle and be enchased, resulting in taking up the whole space. The same result can also be obtained through mixing the cycle pentamer and three-cycle decamer of water. Using the high temperature situation of 25 MPa~35 MPa according to the present invention, the structure of water will change as described above, resulting in the maximum solubility at this time. This resolves water soluble substances in raw material completely, and the fat-soluble substances can also be emulsified to a high level under the operation of nonlinear vibration of ultrasonic, so there is almost no precipitation in the extraction.

The extraction method according to present invention comprises the steps as follows:

1) Crushing and soaking the raw material, and filling them in the extracting equipment 2) Extracting, wherein the extracting step is carried out under a 18~33 kHz nonlinear vibration, using water as solvent, under 25~35 MPa pressure and at the temperature of 0~50° C., thus obtaining an extract which contains the active components of the raw material.

The step of crushing and soaking the raw material is convenient for extraction, and the crushing may be rough processing with moderate size; the soaking time can vary depending on the raw material and the level of crushing, and it is suitable to permeate the raw material completely.

According to another aspect of the present invention, the extracting temperature is preferably 20-50° C., i.e. being carried out under low temperature (compared to the temperature of prior temperature). Because the low temperature can ensure the bioactivity of components and eliminate the processing of heating in traditional processes, it is advanced in some degree.

The mass ratio of raw material and water is 1:3~5, which can save the water resource during the extraction, compared to the 1:10 ratio in the traditional water extraction. This saves the organic solvent ethanol resource during extraction, compared to the alcohol extraction, and also reduces the time of concentrating, drying, or de-alcoholization steps in the subsequent processing, which can reduce the cost significantly.

The extraction time is 1~3 hours; preferably 2 hours. The method according to the present invention uses the condition of nonlinear vibration and critical high pressure, which can strengthen the solubility in water significantly, increase the extraction ratio, and can carry out the complete full-components extraction in medicine or plants in a very short time. It thus has very high extraction efficiency compared to the long time traditional decocting.

The extraction fluid obtained according to the present invention can be directly liquid packed. Or, it can be concentrated, dried, and made into capsules, injectable solution, powder, oral solution or other suitable forms for the convenience of delivery and usage. This is possible because the extraction fluid has been processed by nonlinear vibration and critical high pressure and has been sterilized.

Since the method according to the present invention can dissolve the water soluble and fat-soluble substances, it is suitable for the extraction of many kinds of substances, i.e. the raw material may be Chinese traditional medicine (including the animal based medicine) or plants, even any substance that can to be extracted using the present inventive method. For example, the application of the present inventive method can carry out the full-components extraction in Chinese traditional medicine, but also can carry out the extraction of plant (including fruits) fluid and the extraction of effective component from animals, and thus can be widely used in the fields such as the Chinese traditional medicines (including health-care products) processing, chemical engineering, food, etc. . . . .

Another object of the present invention is to provide an extraction apparatus which can carry out the nonlinear vibration and critical extraction. The apparatus comprises an extracting can consisting of a can body and a top lid, a sealing structure to seal the can body and the top lid, and a pipeline connection to input the water into the can body and output the extraction liquid. The apparatus further comprises a high pressure pump which is linked to the extracting can and maintains the high pressure in the extracting can under 100 MPa. There is a raw material can and a nonlinear vibration apparatus set in the inside of the extracting can, and said nonlinear vibration apparatus may emit nonlinear vibration with the frequency in the range of 18 KHz~33 KHz. The top lid is equipped with a vent hole and a conducting line-connecting hole. The vent hole is connected with a seal valve to connect said nonlinear vibration apparatus with the external electrical source. A water-supplying system is connected with the water-inputting pipe connection to input the water to the extracting can, and a material pump and a material liquid is connected to the extracting can through the extraction liquid-outputting pipe connection. The high pressure pump is known technology of prior art, which can realize maintaining the high pressure in the extracting can, and then keep water in the critical situation, while the nonlinear vibration apparatus in the extracting can carry out the full-component dissolve and extract the raw material in the extracting can. Because of the equipment of the vent hole, it is convenient to achieve inputting and outputting the gas, and thus more sufficient and easy to output the extraction liquid. The equipment of conducting line-connecting hole can connect the nonlinear vibration apparatus with the external electrical source while ensuring the seal and insulation, so that the nonlinear vibration apparatus can be dipped in the liquid and then carry out the nonlinear vibration.

The nonlinear vibration apparatus can be set as a string of nonlinear vibration apparatuses. The axes of the adjacent nonlinear vibration apparatus are perpendicular to each other. The nonlinear vibration apparatus has two proximate ends, said proximate end has the outputting curve surface. A vibrating slice is set between the two proximate ends, an insulation layer is set outside of the vibrating slice, and a conducting line connects the vibrating slice with the external electrical resource of the extracting can. The vibration of this type can realize carrying out the symmetrical and complete nonlinear vibration to the liquid and raw material in the extracting can.

Further, a circulating pump may be equipped on the outside of the extracting can to circulate the liquid inside the extracting can, and make sure that the extraction is symmetrical and quick.

In another embodiment, there is a temperature-controlling apparatus maintaining the temperature in the extracting can in the range of 20~50° C., which ensures that the extraction would be carried out under normal temperature and is more favorable to the extraction of fat-soluble substances.

Furthermore, the present invention provides a water-cleaning system to the above said apparatus. Thus, the present invention provides another extraction apparatus further comprising a water-cleaning system, water-stocking can, and water pump inputting water to extracting can.

In another preferable embodiment, equipping a concentrating system can further concentrate the extraction liquid in the extracting can, and thus meet the subsequent processing of product.

In another aspect, a supersonic atomization apparatus can be used in the above said extraction apparatus. This apparatus comprises an air-filtrating machine set on the top, a atomization room, a gas-gathering room and a gas-outputting fan set under the atomization room. There are a plurality of supersonic generators set in the atomization room, and a liquid-inputting hole inputting the extraction liquid and liquid-outputting hole outputting the concentrated liquid set on the side wall of the atomization room.

It can be seen from the above description of present inventive method that the course of extraction must meet the two conditions of high temperature and nonlinear vibration to realize using water to extract raw material. The present inventive method has practical feasibility because it uses the principles well known in every related field and combines the prior arts subtly to apply them in other fields to obtain the unthinkable effect. The condition of nonlinear vibration can, according to the above prior patent of the present inventor, makes the nonlinear vibration apparatus achieve the said frequency range, and said frequency range belongs to the supersonic nonlinear vibration. It is known to the person skilled in the art that using supersonic vibration can break the wall of substances and promote the dissolving. High pressure also can be realized through the prior art. The physical characters of water in the condition of critical situation also belong to the prior art.

The advantage of present invention is that it makes use of the principles in the prior arts such as supersonic nonlinear vibration, the change of critical water structure and supercritical extraction, etc. . . . . It also uses water as a solvent under high pressure and normal temperature to carry out the substantial full-composition extraction of active components of the Chinese traditional medicine and plants. It not only retains the advantages of the supercritical $CO_2$ extraction, but also overcomes the defaults which cannot be overcome by the supercritical $CO_2$ extraction. It can be widely used in the fields such as the Chinese traditional medicines, chemical engineering, food, etc. . . . to extract the effective components. The detailed advantages are as follows:

1. The method and apparatus according to the present invention may increase the efficiency of extraction. The inventive method and apparatus may extract both water-soluble and fat-soluble components from the Chinese traditional medicine and plants using water under normal temperature, and can carry out the substantial full-composition extraction. This increases the recovery ratio and utilization ratio of the resource.

2. The method and apparatus according to the present invention may carry out the extraction under normal temperature, and completely protect the effective components in the Chinese traditional medicine and plants from being destroyed. This is especially suitable for the extraction of components sensitive to heat and easy to oxidize decomposition. It can keep the original taste of the raw material and overcome the bitter taste resulted from the carbonation which may occurr during the production of Chinese traditional medicine using the traditional decocting method or water extracting method, alcohol-extracting-and-heating-circumfluence method, and thus has important practical application values.

3. The method and apparatus according to present invention use water as a solvent, and eliminates the process of de-alcoholization in the traditional method or the step of being separated from the fluid in the SFE. This not only reduces the process of production and saves on the cost, but also ensures the protection to the Chinese traditional medicine or plants from being destroyed, because with the water as a solvent there will be no chemical changes to the Chinese traditional medicine or plants.

4. The method and apparatus according to the present invention use water as a solvent, compared to the supercritical $CO_2$. Because the solubility of water is much higher than the supercritical $CO_2$, the extraction ratio and the production efficiency are increased, and it is advanced in the practical production.

5. The method according to the present invention uses water as a solvent, and compared to the supercritical $CO_2$, it is not necessary to use high pressure air compressors to operate during the whole process of extraction, which saves on the production cost. Because water can't be compressed, the high pressure operation to water will be much easier than to air, and the energy consumed will be only 1/10 of the prior art, so the whole production process will be easier to operate.

6. The method according to the present invention uses water as a solvent, and because air is always of certain danger under high pressure, the present inventive method has more reliable safety compared to the supercritical $CO_2$.

7. The production process of the present inventive method is simple and is convenient to operate, saves on labor and the large quantity of organic solvent, and reduces the pollution of three types of wastes. The loading material, inletting water, extraction and concentration are incorporated together, which not only is favorable to carry out the GMP standard, but also makes the size small: the volume of extracting can is about 140 L, but has the equivalent yield to the 1-ton can in the prior can.

8. The method and apparatus according to the present invention, as they carry out the critical extraction under high pressure, have the function of anti-oxidation and sterilization, which is favorable to ensure and increase the quality of the production. Generally, the production is a substantial finished product after being taken out from the extracting can, which only need the subsequent processes of concentrating and drying.

9. The method and apparatus according to the present invention, although use water as solvent, use nonlinear vibration and critical high pressure extraction and can extract the water-soluble and fat-soluble components from the raw materials. Thus, it can carry out the extraction to many kinds of raw materials including example Chinese traditional medicine (including the animal and plant based medicine) and plants, and even any substance that can be extracted using the present inventive method.

10. Using the method and apparatus according to the present invention to carry out the extraction can almost achieve the substantial full-composition extraction of the raw material. It reduces the possibility of causing toxic adverse effects resulting from the partial extraction of Chinese traditional effective medicine because it is carried out under a normal temperature and there is no condition for chemical change to take place.

DETAILED DESCRIPTION OF THE INVENTION

Figure 1:
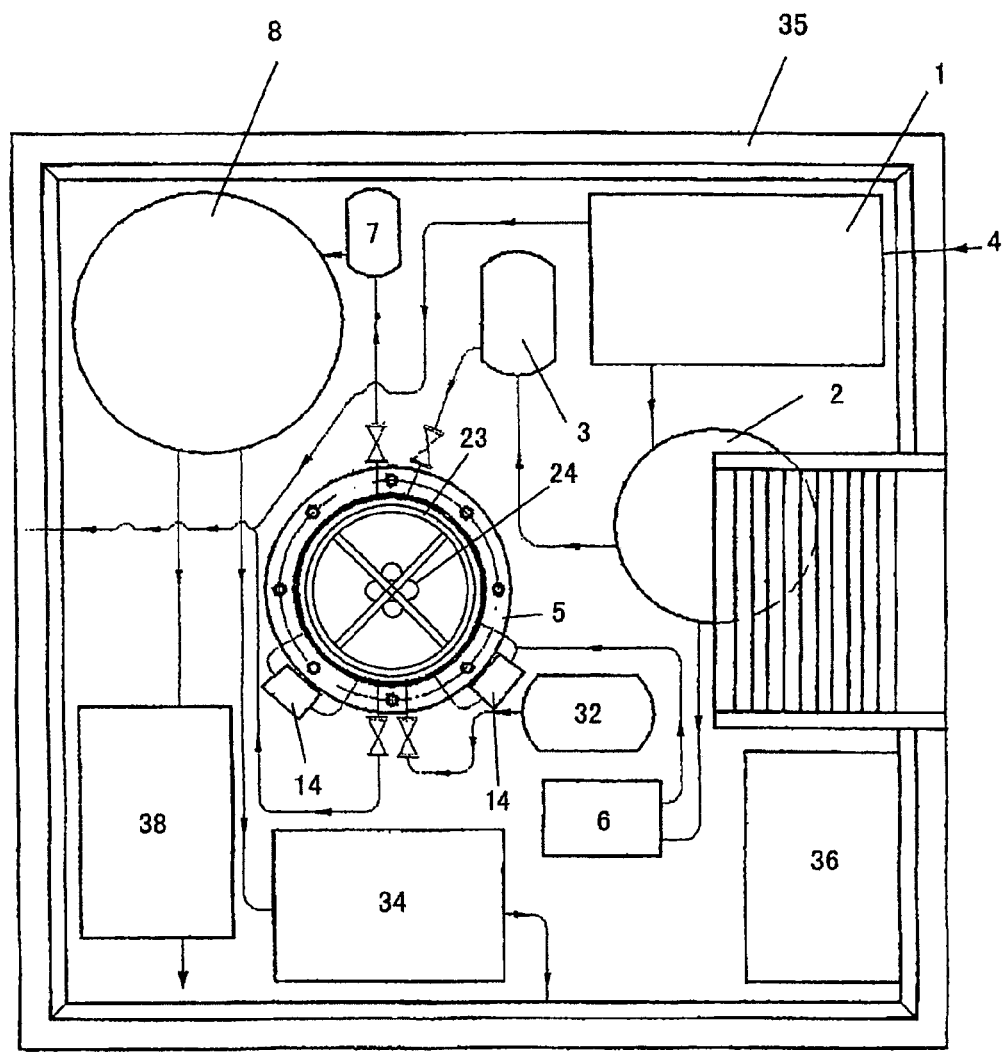
FIG. 1 is an assembly ichnography illustrating one example of the present inventive extraction apparatus.

First of all, referring to FIG. 1, according to a preferred embodiment of the present invention, it shows an assembly sketch map of the extraction apparatus. As shown in the figure, the extraction apparatus can be substantially divided into a water-supplying system, extraction system and concentrating system. Concerning that the present apparatus may be used in the field of medicine and food, the apparatus of the present embodiment should be set up according to the GMP standard requirement.

A water-supplying system supplies the water which meets the requirement of the extraction to the extraction system, and consists of water-processing machine 1, water-stocking can 2, and water pump 3 etc. . . . . Water-processing machine 1 uses the method and apparatus of cleaning water known in prior art such as macroporous adsorbent resin or active carbon filtration apparatus. The water resource such as tap water etc. enters the water-processing machine 1 through the infall 4 and is cleaned. It then enters the water-stocking can 2, and can be inputted into the extracting can 5 through the water pump 3.

The extraction system can carry out the full-composition extraction of the raw material in extracting can 5 under a 18~33 kHz nonlinear vibration and a 25~35 MPa pressure. It can extract the component desired to form the extraction liquid. The extraction system comprises an extracting can 5, high pressure pump 6, material pump 7, material fluid can 8, inner canister 23, nonlinear vibration apparatus 24, and air compressor 32 etc. . . . . Said extracting can 5 may stand the pressure of 100 MPa. The high pressure pump 6 is connected between the water-stocking can 2 and extracting can 5. Thus, it can pump the high-pressure water into the extracting can 5 and then the pressure in the air-proof extracting can 5 gets the predetermined value.

Figure 2:
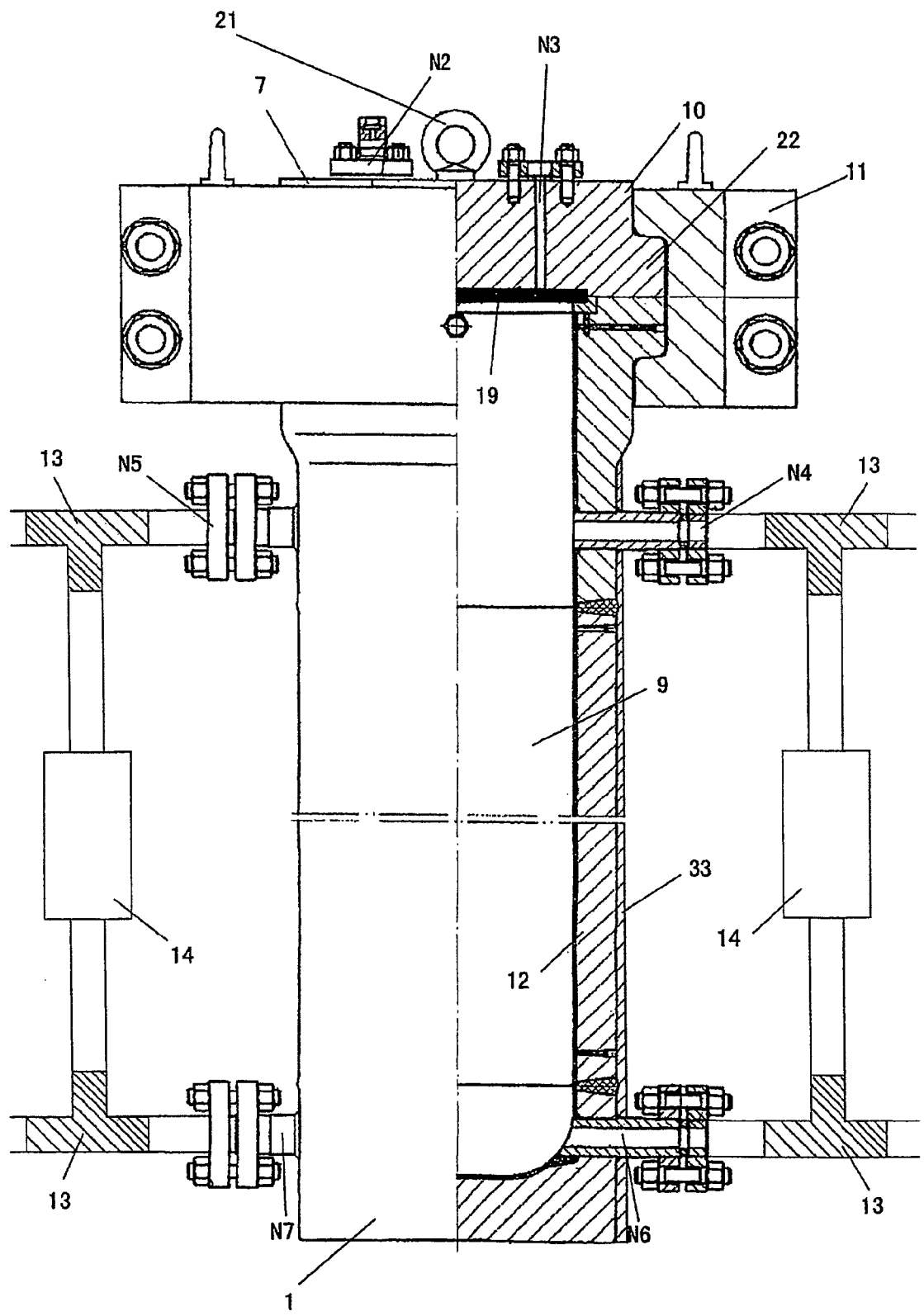
FIG. 2 is partial cross-section view illustrating the extracting can of the extraction apparatus.
Figure 3:
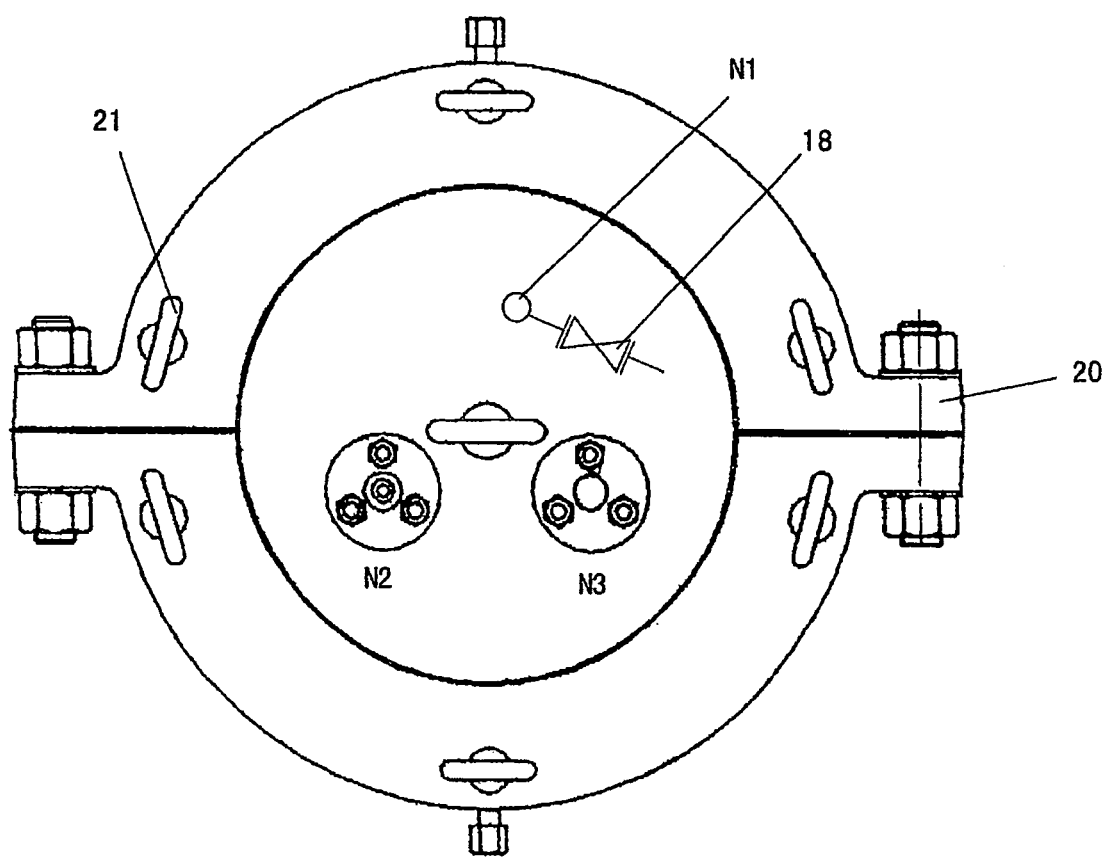
FIG. 3 is the planform view of the extracting can shown in FIG. 2.
Figure 5:
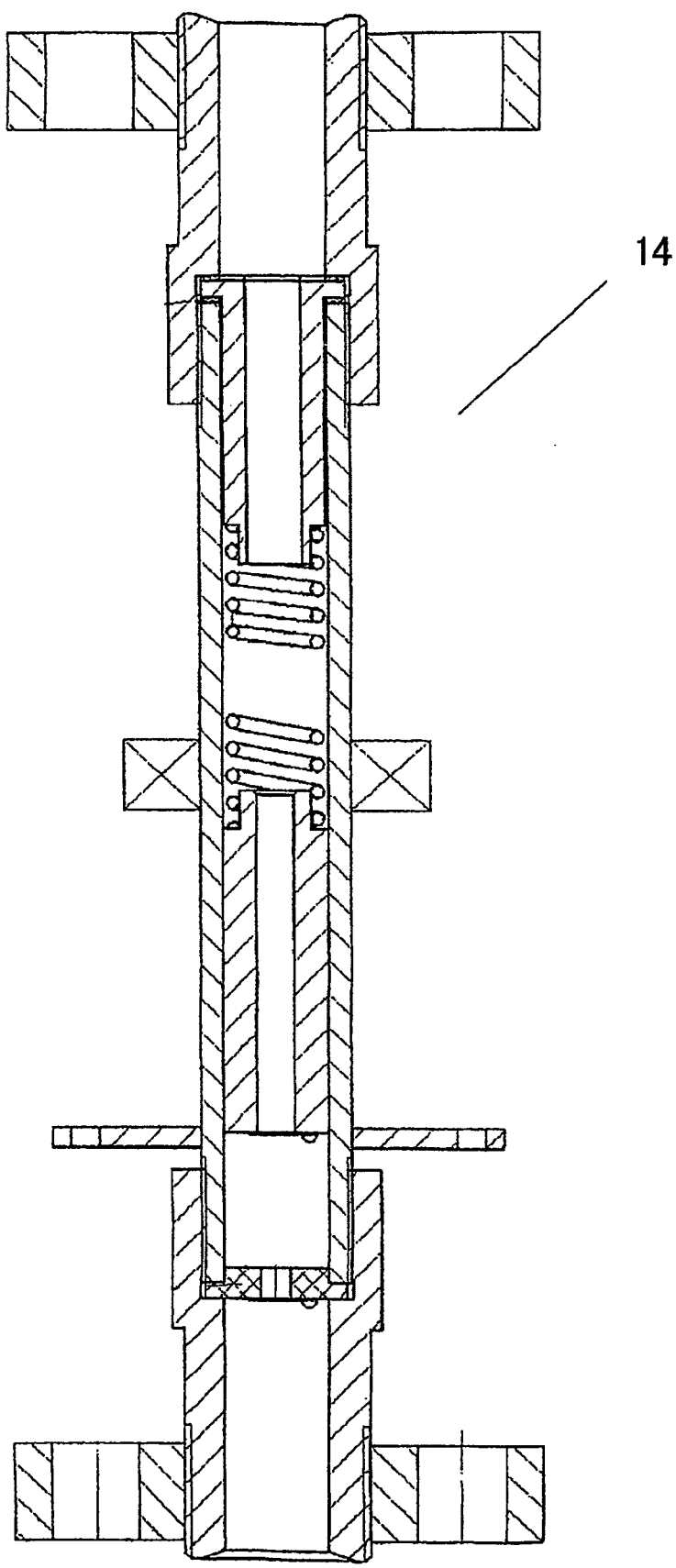
FIG. 5 is the cross-section view illustrating a magnetic pump.

Extracting can 5 is the main equipment to carry out the nonlinear vibration and critical extraction, and only when the condition in extracting can 5 is normal temperature and nonlinear vibration, the extracting can 5 can achieve the full-composition extraction of the raw material in it. As shown in the structure of FIG. 2, it has a cylindrical can body 9, a top lid 10, a seal washer and two semicircle collars 11. Two clamps 22 are tightly connected by using the bolt, and the can body 9 and top lid 10 can be fastened, and thus the extracting can 5 is sealed. To meet the requirement of can body 9 in the aspect of standing the high pressure, can body 9 is made of high strength low alloy steel through smithing and welding, and there is a layer of stainless steel lining attached on the inner wall of can body 9. There are four interfaces (i.e. N4, N5, N6 and N7) radially and symmetrically set near the both ends of the side wall. The water or other liquid cleaned in the water-supplying system may be inputted into the extracting can 5 by the water pump 3 and the interface N7 while the interface N6 is used to output the extraction liquid. There is three-way piece 13 set on the external pipeline connected to each interface, and there is a magnetic pump 14 set between two three-way pieces 13. FIG. 5 shows the structure of magnetic pump 14, and said magnetic pump 14 may promote the high-pressure liquid in the extracting can 5 to circulate between the can body 9, interfaces and the external pipelines. There is still a heating-and-warming machine 33, which can ensure that the assistant heating and warming can be carried out to the can body 9. It also ensures that the extraction temperature is maintained in the range of 20~50° C., and thus fulfills the extraction of fat-soluble substances and the bioactivity of the extracted components. The top lid 10 covers the top of can body 9, and is made of stainless steel, and the external diameter is substantially equal. As shown in FIG. 3, can body 9 is equipped with a vent hole N1 through its bottom and top surface, pipeline-connecting hole N2, pressure meter-connecting hole N3 and a lifting lug 21 positioned in its centre. Said vent hole N1 is peripherally connected with vent hole and an seal valve 18. The pipeline-connecting hole N2 may guide the external electrical resource into the extracting can 5 through said hole while ensuring the insulation and pressure seal. The pressure meter on the top lid 10 is connected to the inside of the extracting can 5 through pressure meter-connecting hole N3, and the pressure meter can monitor the real time pressure valve in the extracting can 5.

The section view of collars 11 is in the shape of U, which has two side ears 20. A hole was set on the ears 20 to traverse the bolt, and the collars 11 can carry out the radial movement relative to the can body 9. When the two collars 11 separately moves toward the center of the can body, the two side ears are face to face, and the two side ears can be connected by the bolt. There is a semicircular groove in the side ear, so it can admit the gibbous flange 22 of the top lid 10 and the can body 9. With the tightness of the bolt, the seal between the top lid 10 and the can body 9 is achieved.

Figure 4:
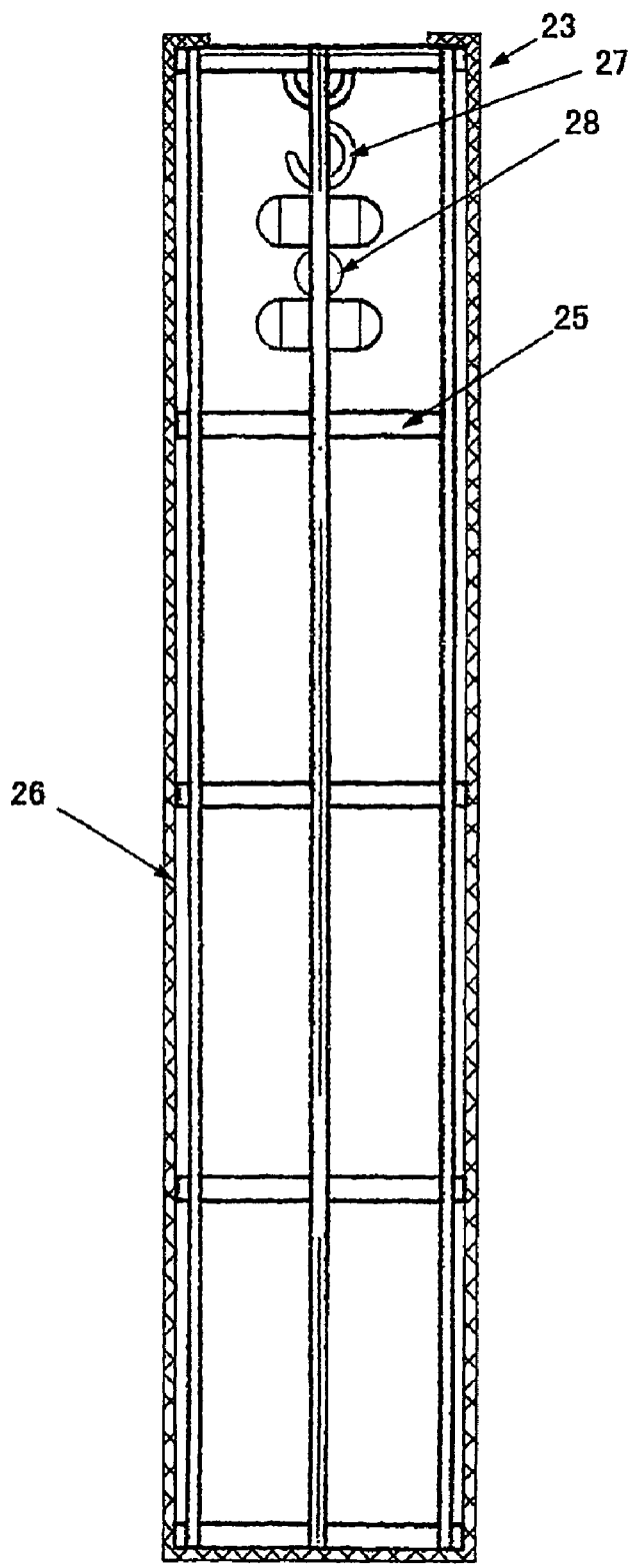
FIG. 4 is a main view of the connection between material can and the vibration apparatus.

Inner canister 23 is in the interior of can body 9, and the length of inner canister 23 is slightly less than the depth of the can body 9. As shown in FIG. 4, the inner canister 23 comprises a bracket 25 and filter cloth bag 26. Bracket 25 is made of stainless steel material in a substantially cylindrical shape with hook 27 is set in its top center. Hook 27 is used to hang the nonlinear vibration apparatus 24 to ensure the nonlinear vibration apparatus 24 is in the center of the extracting can 5.

Figure 6:
FIG. 6 is the structure sketch map of the nonlinear vibration apparatus.
Figure 7:
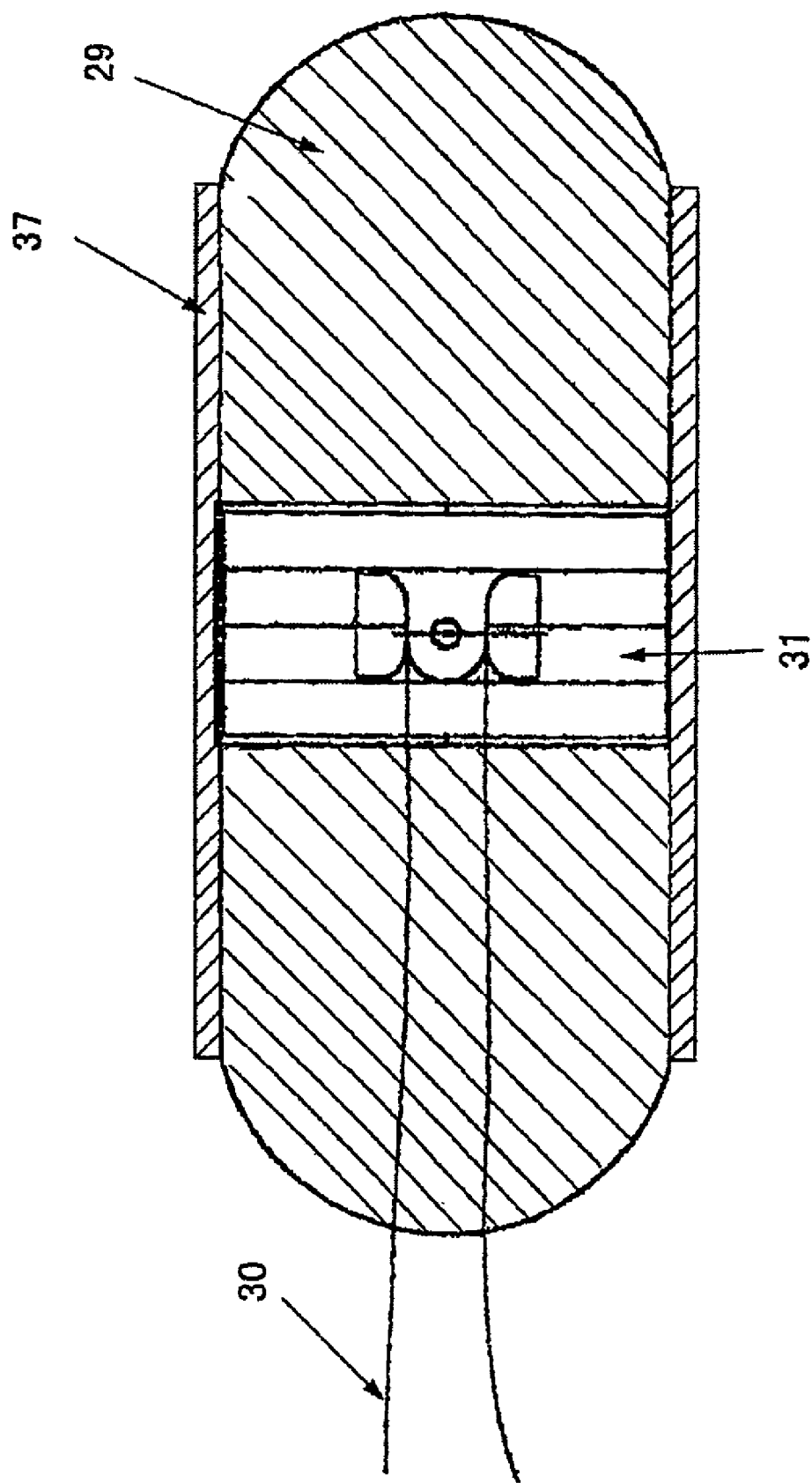
FIG. 7 is the cross-section view illustrating the nonlinear apparatus.

As shown in the structure sketch map in FIG. 6, the nonlinear vibration apparatus 24 is a string body consisting of twelve vibration apparatus 28 connected one by one, which may emit the nonlinear vibration, and said string body hangs in the hook 27 of the bracket 25. The vibration apparatus 28 is set breadthwise to the can body 9, and the adjacent vibration apparatus 28 are vertical with each other. The nonlinear vibration apparatus is immersed in the high-pressure water directly so the connecting pipeline should not only ensure the insulation to water under high pressure, but also ensure the connection with the external electrical resource through the pipeline-connecting hole N2 on the top lid 10 to achieve the nonlinear vibration. FIG. 7 shows a section view of the vibration apparatus 28, which comprises two proximate ends having outputting surface, and there is a piezoelectric ceramics vibrating slice 31 set between the two proximate ends 29. The insulation layer 37 is set outside of the vibrating slice 31 to keep it insulated from the liquid around. When the vibrating slice 31 is electrified by the connection with the external electrical resource through the pipeline, the nonlinear vibration can be carried out because of the magnetostrictive effect to meet the requirement that the extraction of different component should carried out under the vibration of different frequency and achieve the full-component extraction. The heads of the proximate end 29 are in the shape of a half of a ball, thus the wave-transferring plane of the vibration apparatus 28 can be changed in to curve surface, and each vibration can get the maximum swing. In addition, to ensure that the raw material in the can body can get the nonlinear vibration equally, the multiple vibration apparatus 28 should be assembled into a string breadthwise, the length of which is proximately equal with the internal length of the can body 9, and the adjacent axis of the vibration apparatus 28 is perpendicular with each other in different surfaces.

Pipe interface N6 is connected with the material pump 7 through the three-way piece 13 so the material pump 7 can draw the nonlinear vibration critical extracted extraction liquid into the material fluid can 8. There is also a hole on the top lid 10 to connect with the air compressor 32. After the extraction process is completed, the air compressor 32 can fill the pressure air into the seal extracting can 5, and further extract the extraction liquid remaining in the raw material and the apertures of the raw material, which is then is drawn out by the material pump 7, so the usage efficiency of raw material is increased.

Figure 8:
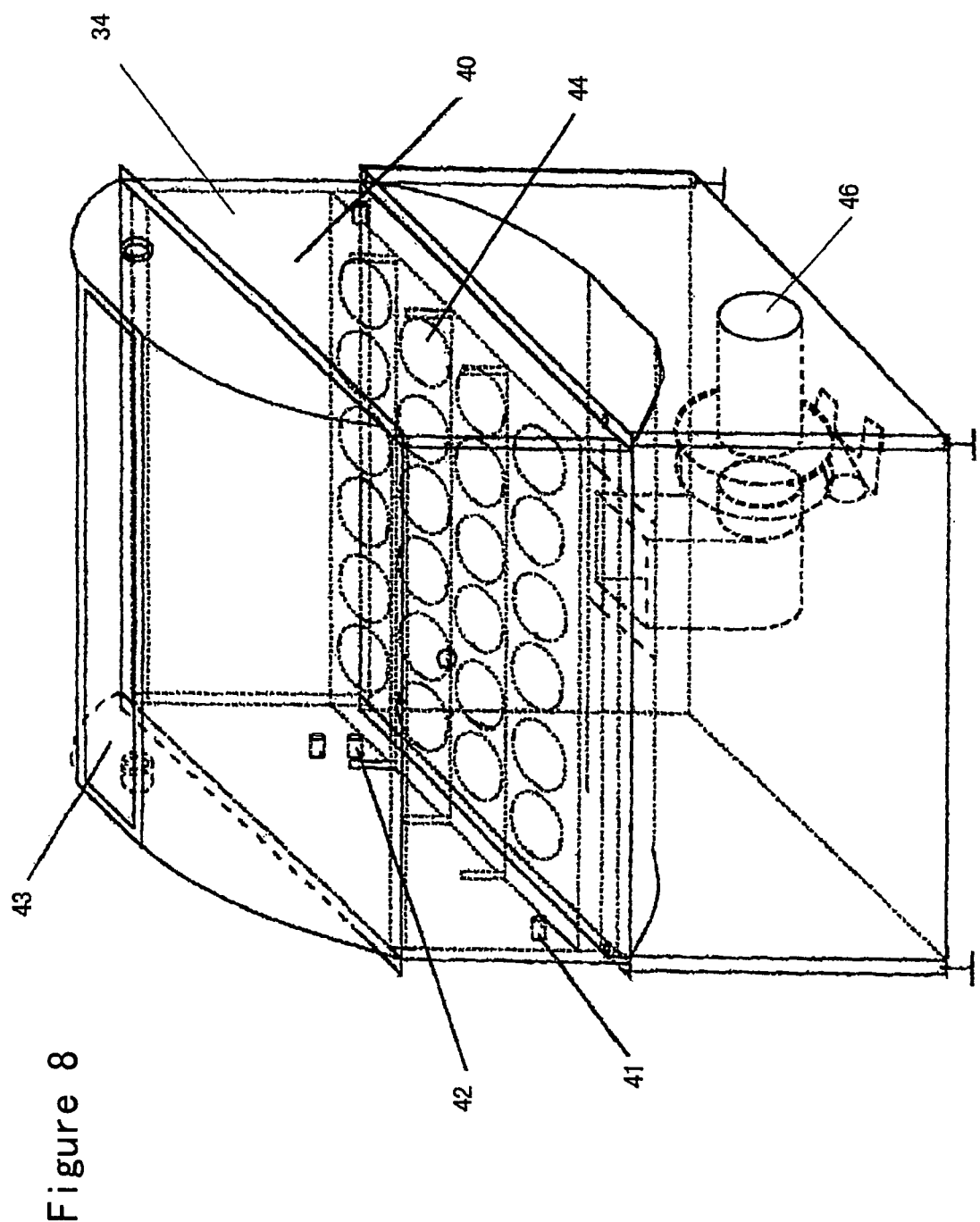
FIG. 8 is the structure sketch map of the supersonic atomization apparatus.

As for the extraction apparatus according to the present invention, it further includes a concentrating system, which may carry out the treatment such as concentrating and drying to the extraction liquid extracted from the extraction system, and thus meet the requirement of the post-production processing. In the present example, a supersonic atomization apparatus 34 is used to carry out the concentrating, which is connected with the material fluid can 8, and the extraction liquid is directed into said apparatus. As shown in the main structure in FIG. 8, the supersonic atomization apparatus 34 mainly comprises the air-filtering machine 43 set on the top, an atomization room 40, a gas-gathering room 45 and gas-outputting machine 47 set under the atomization room 40. There is a plurality of supersonic generators 44 set in the atomization room 40, and a liquid-inputting hole 41 inputting the extraction liquid and liquid-outputting hole 42 outputting the concentrated liquid set on the side wall of the atomization room 40.

Figure 9:
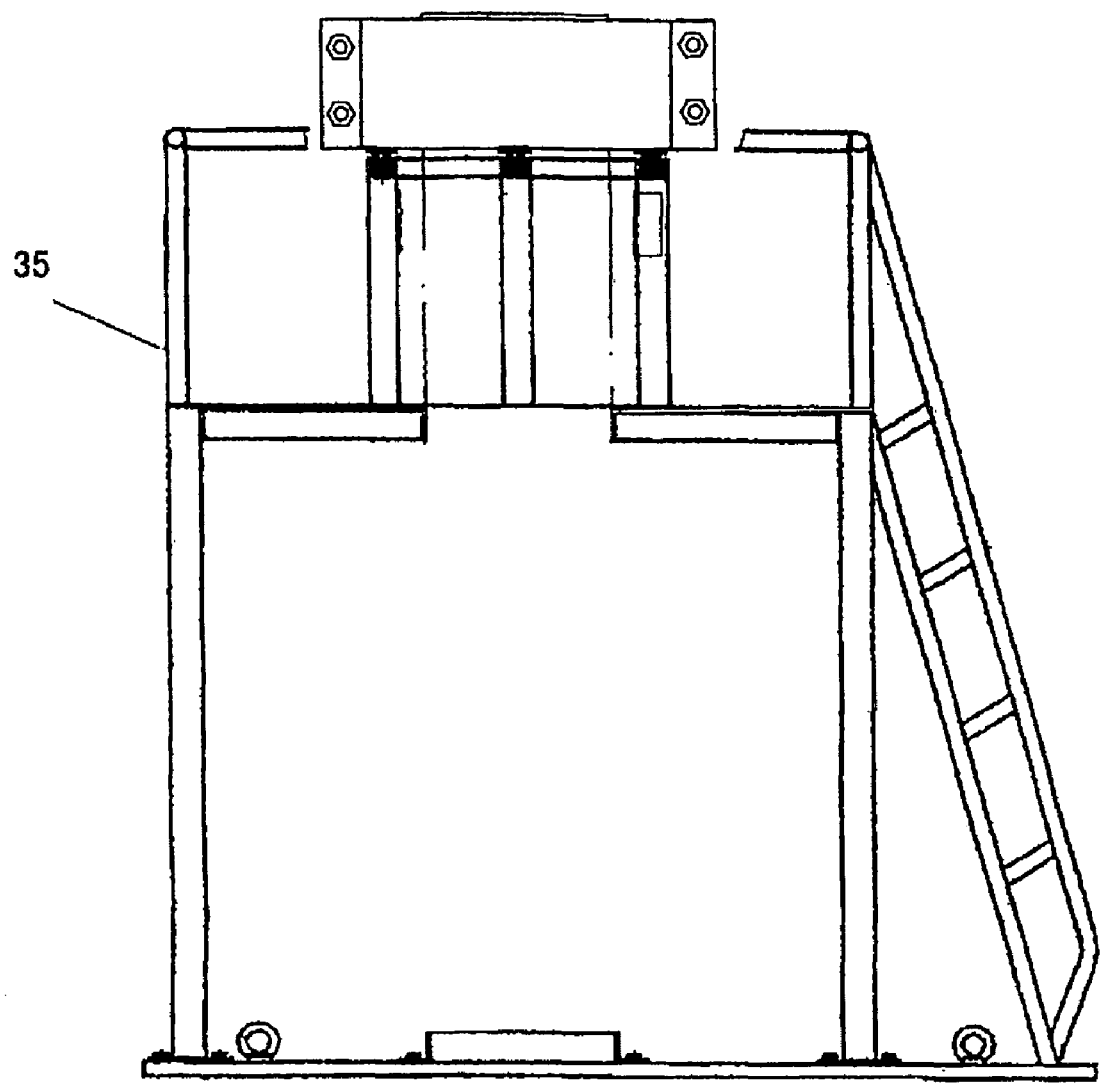
FIG. 9 is a main view of the nonlinear vibration extraction apparatus.

As shown in FIG. 1 and FIG. 9, in the nonlinear vibration critical extraction apparatus of present example, after being assembled, all the systems are contained in the frame 35, and there is an additional material delivery system set on the frame 35 to take the place of manual delivery. Additionally, a crane apparatus may be set on the frame 35, such as a group of pulleys or small crane. An electrically controlled ark is set on one side of the frame 35 to ensure the centralized controlling to the above components. Said apparatus, after being assembled, only occupies an area of four square meters and is suitable for the corporations or companies which are strict with the production area and the energy resources consumed. Every system may be comparatively independent, is easy to connect has a simple structure, and consumes a low amount of energy resources.

When carrying out the extraction to the plant or medicine using the present inventive extraction method, first take the inner canister 23 in the can body 9 (the structure of inner canister 23 comprises a bracket 25 enwrapped with filter cloth bag 26) with the nonlinear vibration apparatus 24 hung in the hook 27 of the bracket 25. The nonlinear vibration apparatus 24 is positioned in the center of can body 9 with the conducting line connected to the external electrical resource. Fill the dipped raw material into the filter cloth bag 26 cover the top lid 10 on the can body 9, and then tightly connect the two collars 11 by using the bolts, and thus seal the top lid 10 and can body 9.

Close the other holes and the valves, open the seal valve 18 and water pump 3 on the top lid 10, and the water in the water-stocking can 2 is delivered into the extracting can 5 from the bottom of can body 9 through the pipeline-connecting interface N7 until the whole inner space of can body 9 is filled. Then dip the inner canister 23, raw material, and the nonlinear vibration apparatus 24 into the water. When the air in can body 9 is discharged from the can through air-outputting N1, the seal valve 18 and water pump 5 is closed.

Start the high-pressure pump 6, and increase (and maintain) the pressure in the extracting can 5 to a predetermined value, so that the water is in the high pressure critical condition. Then, start the nonlinear vibration apparatus 24 to initiate the nonlinear vibration, and start the two magnetic pumps 14. Accelerate the fluid of high pressure water, and increase the dissolving of every components, and thus carry out the full-component extraction.

After the vibration is completed, open the seal valve 18 and material pump 7, to draw the extraction liquid into the material liquid can 8 for the further extraction to the extraction liquid. Then connect the air compressor 32 with the vent hole N1, and charge the pressure gas into the extracting can 5 so the extraction liquid, remaining in the raw material and the aperture of raw material, is extracted out by the pressure of the gas.

The supersonic atomization apparatus of the concentrating system may carry out the concentrating to the extraction liquid to meet the requirement of preparation or other criterion. The extraction liquid enters the atomization room 40 from the material fluid can 8 through the liquid-inputting hole 41, and the supersonic generators 44 are started so the water of the extraction liquid forms the atomization and volatilizes out, and then is discharged by the exhausting fan 46, and thus the extraction liquid is concentrated. The bioactivity of said extraction liquid is protected from being affected, and the concentrated extraction liquid is discharged from the liquid-outputting hole 42 to carry out the package and other processes.

When the washing is carried out to the can body, the washing may be carried out through directly opening the water pump 3 to fill the water into can body 9, and the water after washing may be discharged through the pipeline interface.

The apparatus of the present invention is not limited to the above preferred examples, but may have different variations. For example, the water-stocking can 2 of the water-supplying system may be equipped with a heating apparatus to make the water get to normal temperature. In addition, when the water supply is enough, the satisfied water resource may be connected to the extraction system directly while the water-supplying system is eliminated.

In other preferred examples, the nonlinear vibration apparatus and circulating pump of other types such as machinery or electromagnetism may be used to carry out the nonlinear vibration and promote the liquid circle. The seal of top lid 10 and body can 9 may use the type of double-cone seal or washer seal, which are known in the prior art. In addition, other concentrating apparatuses well known in the art may be used to concentrate the extraction liquid, such as membrane separation apparatus 38.

The preferred examples according to the present invention are set forth as follows:

Example 1

Use the Present Inventive Method and Apparatus to Extract the Angelica

This example uses the extraction of angelica. The pharmacopoeia uses the ferulic acid concentration in the angelica as the evaluation criterion while the ferulic acid is fat soluble. Thus, it uses the present inventive method and apparatus to carry out the control experiments which may sufficiently demonstrate that using the present inventive method not only can extract water-soluble and fat-soluble substances by using water as solvent, but also has a certain extraction efficiency and increases the utilization ratio of the medicine or plant.

Materials: angelica, which is the dried root of the *Angelyca sinensis* (*Oliv.*) *Diels*. The producer of the tested angelica is HUA LONG Chinese Traditional Drug, type is slices, and batch number (B.N.): 200330621. The angelica is roughly comminuted to use.

Take 5 kg angelica raw powder, and dip it for 12 hours under normal temperature. Add it to the extracting can, and add about 15 kg of water with normal temperature. Increase the pressure, and maintain at 25 Mpa, and maintain temperature at about 22° C., and start the inventive nonlinear vibration apparatus to carry out the extraction for 1.5 hours. The extraction liquid those obtained, which is a light orange and relatively transparent emulsion, and its specific gravity is 1.004. The liquid has no bitterness, and remains the original light aroma of angelica, and there is substantially no precipitation, and it still keeps the situation of emulsion after standing for 2 weeks without new precipitation. This may demonstrate that the property of the angelica extraction liquid is quite stable.

Example 2

Use the Present Inventive Method and Apparatus to Extract the Angelica

Use the remaining residue in example and add 15 kg water with normal temperature to the extracting can to carry out the second extraction. Maintain the pressure at 30 Mpa, and increase the temperature suitably to 30° C. The extraction time is 1 hour, thus the extraction liquid is obtained, which is a light orange and relatively transparent emulsion, and its specific gravity is 1.000. The liquid has no bitterness, and remains the original light aroma of angelica. There is substantially no precipitation, and it still keeps the situation of emulsion after standing for 2 weeks without new precipitation. This may demonstrate that the property of the angelica extraction liquid is quite stable.

Example 3

Use the Present Inventive Method and Apparatus to Extract the Angelica

Take 5 kg angelica raw powder (is the same group of the example 1), and dip it for 12 hours under normal temperature. Add it to the extracting can, followed by adding about 15 kg water at normal temperature. The condition of extraction is shown in Table I.

TABLE I

| | working pressure (Mpa) | vibration time (min) | extraction temperature (° C.) |
|---|---|---|---|
| extraction condition | 25.0 | 10 | 35 |
| | 27.0 | 10 | 35 |
| | 29.5 | 20 | 35 |
| | 35.0 | 20 | 35 |

The extraction liquid is obtained, which is a light orange and relatively transparent emulsion, and its specific gravity is 1.004. The liquid has no bitterness, and remains the original light aroma of angelica. There is substantially no precipitation, and it still keeps the situation of emulsion after standing for 2 weeks without new precipitation. This may demonstrate that the property of the angelica extraction liquid is quite stable.

Example 4

Determine the Ferulic Acid Concentration in the Angelica Extraction Liquid Obtained by Using the Inventive Method The test is carried out according to the HPLC (high performance liquid chromatography) method provided in the Chinese Pharmacopoeia 2000, Par I, Appendix VI D.

1) The Liquid Chromatography of the Ferulic Acid Control Sample

Ferulic acid control sample 0773-9910 (provided by the National Institute for the Control of Pharmaceutical and Biological Products)

Figure 10:
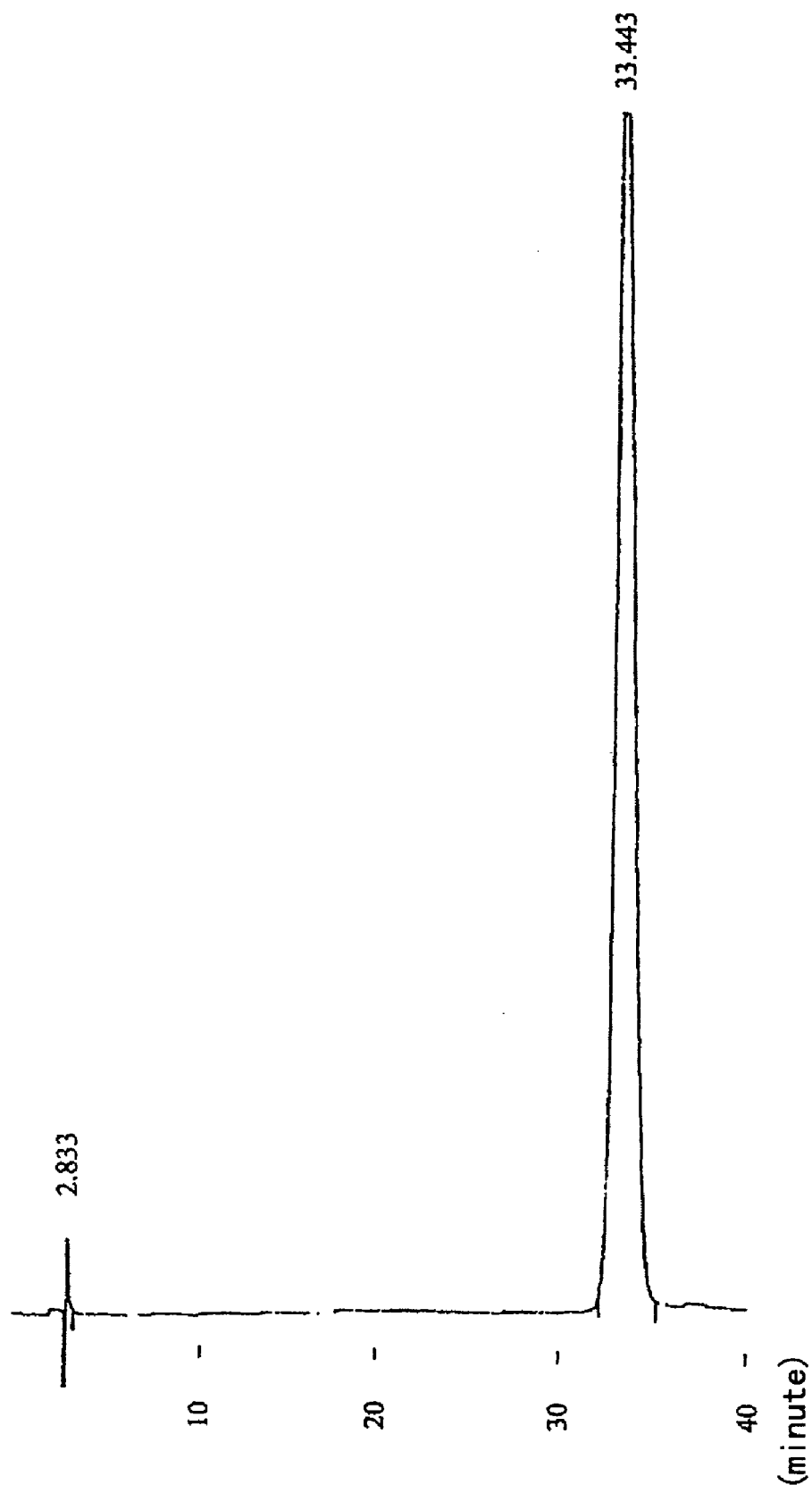
FIG. 10 is a liquid chromatography of the ferulic acid control sample.

Take 0.0050 g ferulic acid control sample finely, and add methanol to form a solution containing 10 μg per 1 ml. Take 10 μl control sample solution and inject into the HPLC apparatus (STD-10Avp Shimadzu, Japan) to test the chromatography, so the ferulic acid control chromatography is obtained. As shown in FIG. 10, the y-axis shows the time (time), which demonstrates that the peak of ferulic acid occurs at about 30 minutes.

2) Determine the Ferulic Acid Concentration in the Angelica Extraction Liquid Obtained in Example 1.

Figure 11:
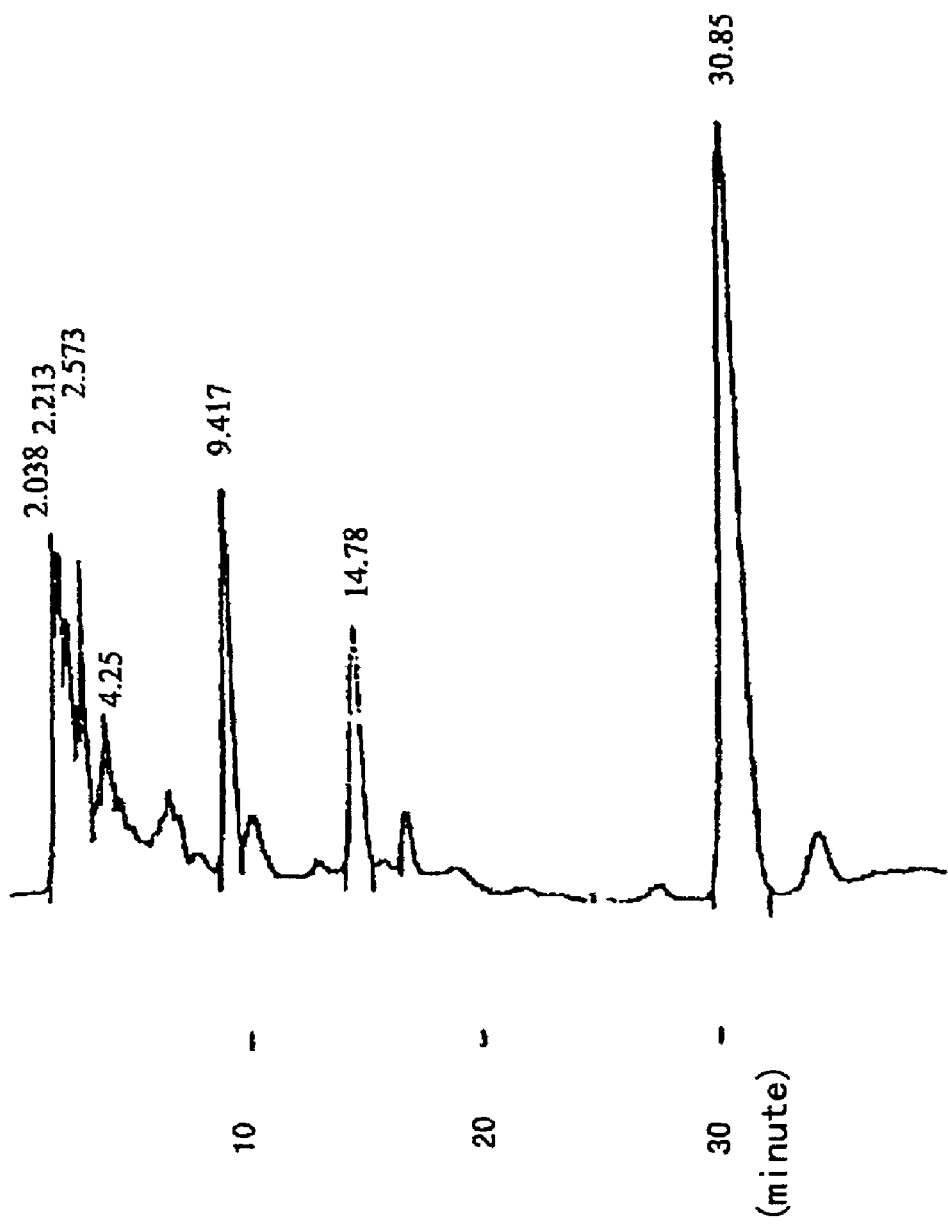
FIG. 11 is a liquid chromatography of the first extraction liquid using the method and apparatus according to the present invention.

Take the extraction liquid obtained in example 1 and inhale 15 ml finely to the conical flask with plug, and add 10 mixture solution of 90% methanol-HCl (100:1) finely followed with weighing, and then carry out the ultrasonic treatment for 30 minutes. Allow to come to room temperature, and weigh to determine the reduced weight and use above said solution to balance the reduced weight, and then filtrate, take the filtration liquid, and thus obtain the solution. Take 10 μL and inject into the HPC apparatus to get the chromatography, as show in FIG. 11. Using the number processing machine of chromatography apparatus, it can be calculated that the raw medicine contains 0.1803 g ferulic acid per kilogram medicine.

3) Determine the Ferulic Acid Concentration in the Angelica Extraction Liquid Obtained in Example 2.

Figure 12:
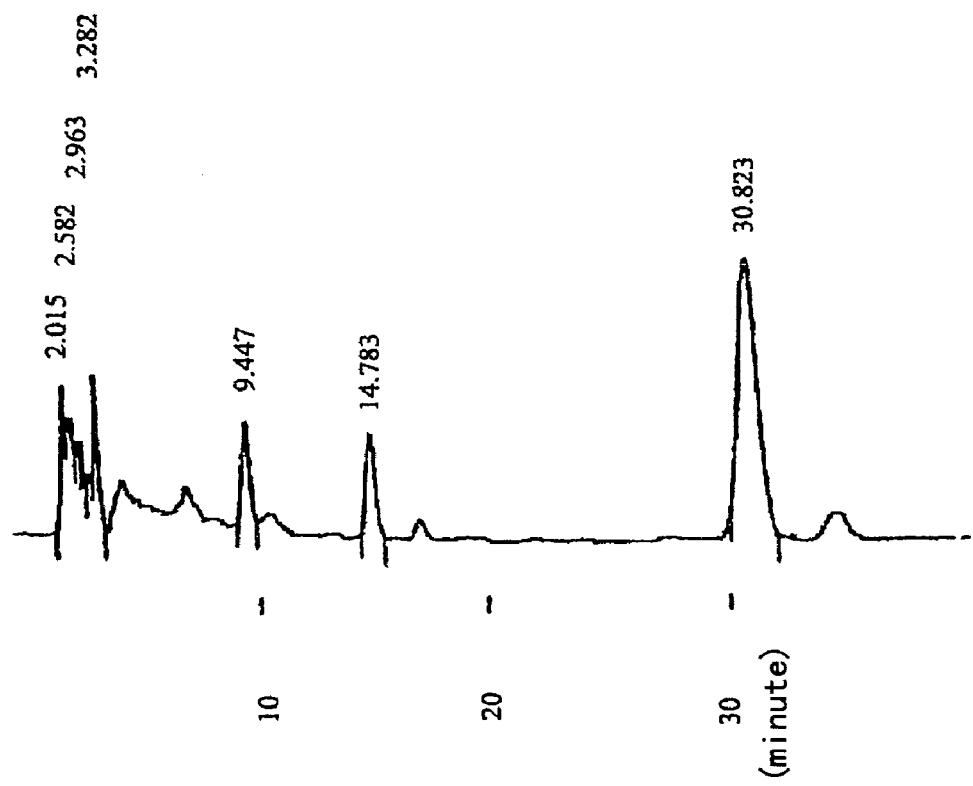
FIG. 12 is a liquid chromatography of the second extraction liquid using the method and apparatus according to the present invention.

Take the extraction liquid obtained in example 2 and carry out the determination procedure described in 2) Get the chromatography as shown in FIG. 12. It can be calculated that the raw medicine contains 0.0577 g ferulic acid per kilogram medicine. Compared with the result of the extraction liquid in example 1, the result suggests that the use of the inventive method to carry out the extraction for one time can extract a majority of the ferulic acid in the medicine liquid.

Comparative Example 1

Use Ethanol to Continuous Circumfluence Extract Angelica

Take 600 g angelica raw powder (is the same group of angelica raw powder in the example 1) and use 70% ethanol to carry out the continuous circumfluence extraction for two times (the total amount of the 70% ethanol is 6 times of the angelica raw powder, wherein the first extraction takes 4 times of the angelica raw powder, and another extraction takes 2 times of the angelica raw powder). Each extraction is carried out for 2 hours. Then filtrate and gather the filtration liquid, recover the ethanol, and concentrate to 1000 ml (i.e. one ml extraction liquid is equivalent to 0.6 g angelica slice). Finally, you get the deep brown transparent liquid, which has bitterness and some precipitation.

Add 3×70% ethanol to medicine residue obtained after the circumfluence extraction and heat to circumfluence extraction for 2 hours. Filtrate, recovery the ethanol, and concentrate to 1000 ml (i.e. one ml extraction liquid is equivalent to 0.6 g angelica slice). Finally, you get the deep brown transparent liquid, which has bitterness and some precipitation.

This comparative example demonstrates that in the traditional method of using ethanol to carry out the extraction, the ratio of consumed ethanol is very high compared to the raw material, and the step of eliminating the alcohol from the extraction liquid is necessary. This method not only consumes a large amount of ethanol, but also is complex. Because the result production is processed with high temperature, partial components have changed and lose the activity. Bitterness occurs, and the appearance and taste of the production are not as good as the production obtained by the inventive method.

Comparative Example 2

After Washing With Water, Use Ethanol to Continuous Circumfluence Extract the Residue Liquid Remained After the Extraction of Example 2

Take 1.35 kg (which is equivalent to 600 g dry medicine) of the residues obtained after the extraction using the inventive method in example 1, and washes with warm water. Then add 1800 ml 70% ethanol to carry out the heating and circumfluence extraction for 2 hours; filtrate, recover the ethanol, and concentrate to 1000 ml (i.e. one ml extraction liquid is equivalent to 0.6 g angelica slice) and thus get the light orange transparent liquid, which has some precipitation.

The present comparative example is to further demonstrate the effect of present inventive method in the next test result of comparative example 3.

Comparative Example 3

Control of the Ferulic Acid Test Result

1) Test the Ferulic Acid Concentration in the Extraction Liquid of Comparative Example 1.

Figure 13:
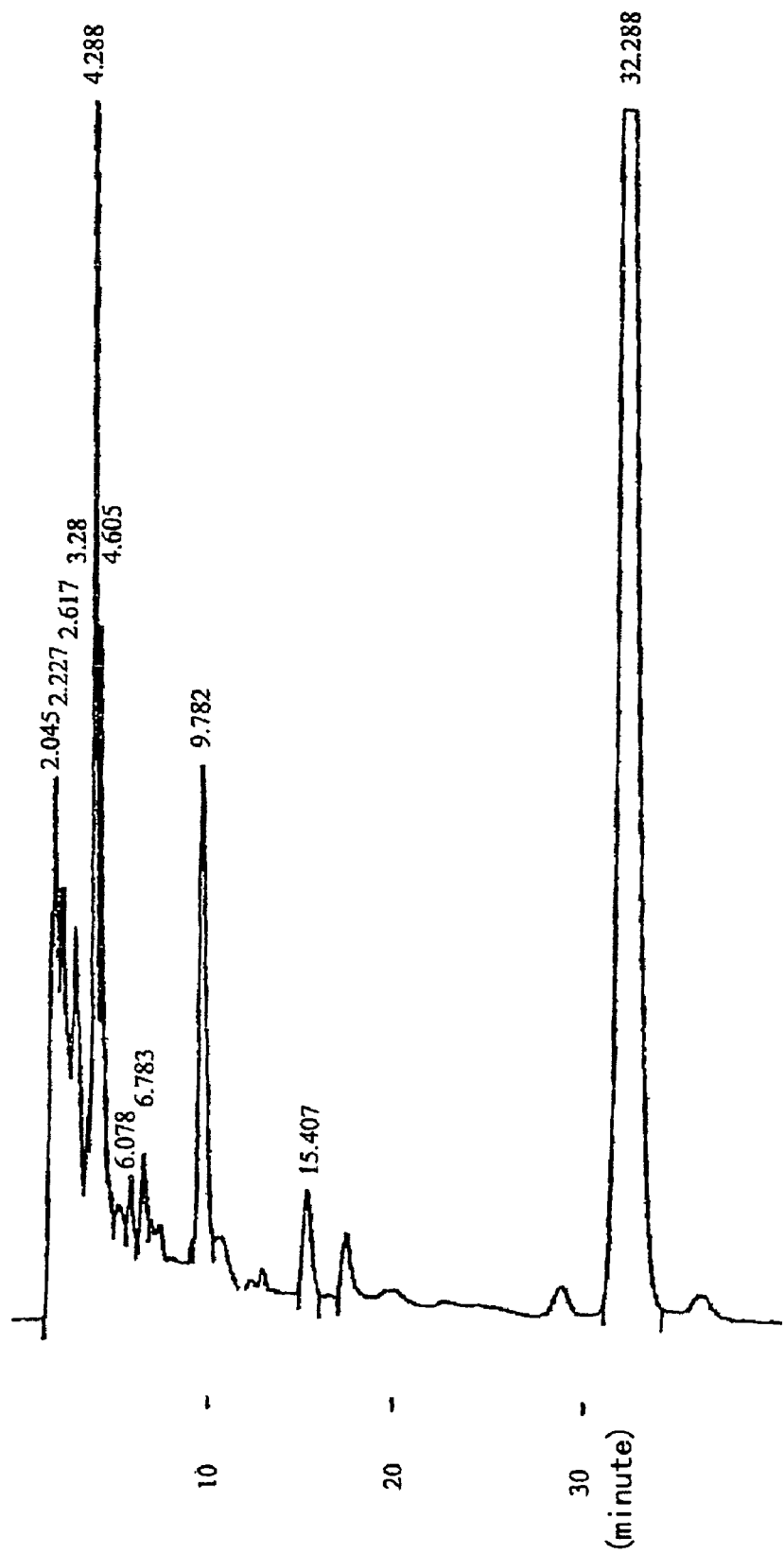
FIG. 13 is a liquid chromatography of the first extraction liquid using the method of alcohol-circumfluence heating.

Take the circumfluence extraction liquid obtained in example 1, the test process is as described in 2) of example 4, and get the chromatography, as shown in FIG. 13. It can be calculated that the raw medicine contains 0.4952 g ferulic acid per kilogram medicine.

The ferulic acid concentration in this comparative example is higher than the ferulic acid obtained by using the inventive method, but because there are still components other than ferulic acid such as ferulic sodium, ferulic ester (up to 40 types) in angelica. The cause of the ethanol extracting method getting higher ferulic acid concentration is that the ferulic ester produces ferulic acid through degreasing, thus the raw material component is changed. The present inventive method uses water as a solvent, which hardly changes the raw material component or destroys the bioactivity. The present comparative example substantially demonstrates that the traditional extraction method using ethanol changes the raw material component, while the inventive method carries out the full-composition extraction and does not change the activity of the component and no chemical change happens.

2) Test the Ferulic Acid Concentration in the Extraction Liquid of Comparative Example 2.

Figure 14:
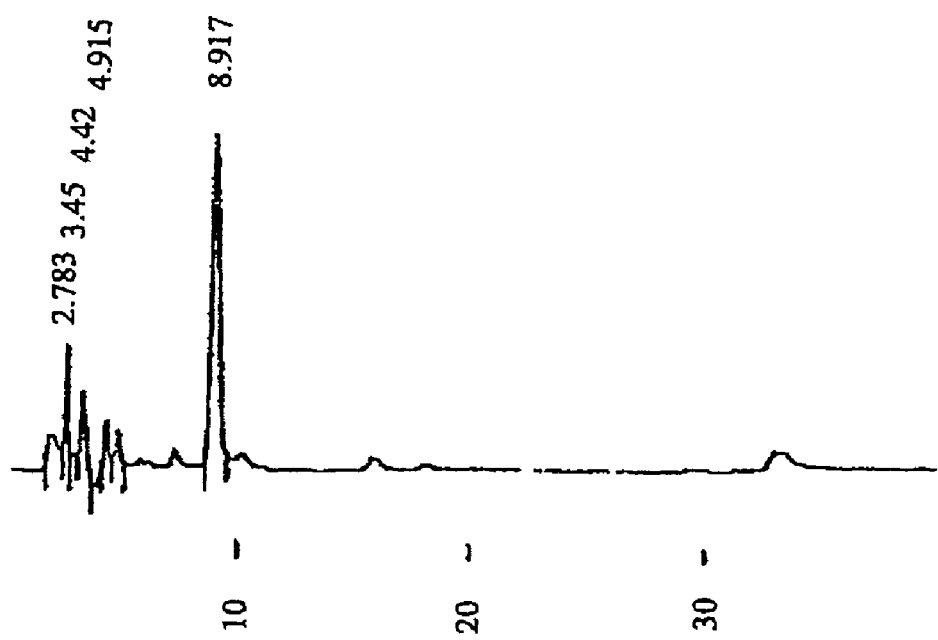
FIG. 14 is a liquid chromatography of the extraction liquid obtained through carrying out the water washing and then alcohol extraction to the remaining medicine residue, obtained after the extraction using the method and apparatus according to the present invention.

Take the extraction liquid obtained in comparative example 2 and then take 1 ml and add 14 ml purified water, carry out the other procedures as described in 2) example 4, and get the chromatography, as shown in FIG. 14.

The figure of this comparative example has no peak value of ferulic acid, which demonstrates that there is no ferulic acid, that is to say, there is no ferulic acid in the residue. It is demonstrated that the ferulic acid and ferulic esters may be completely extracted by using the present inventive method through the nonlinear vibration critical extraction. Using water as the solvent not only extracts the water-soluble substances, but also extracts the fat-soluble substances (such as ferulic acid) may be emulsified and then be extracted.

The invention claimed is:

1. A method for preparing a plant extract, comprising the steps of: crushing and soaking a plant, and then extracting at least one of water-soluble substance and fat-soluble substance from the plant using water as a solvent, wherein the extracting step is carried out under the simultaneous conditions of a 18-33 kHz nonlinear vibration, a pressure of 25-35 MPa and at a temperature of 0-50° C., thus obtaining an extraction fluid.

2. The extraction method of claim 1, wherein the extraction temperature is 20° C.-50° C.

3. The extraction method of claim 1, wherein the extraction time is 1-3 hours.

4. The extraction method of claim 1, wherein the ratio of a plant to water solvent by weight is 1:3-5.

5. The extraction method of claim 1, wherein said method further includes a step of packaging the said extraction fluid.

6. The extraction method of claim 1, wherein said method further includes the steps of concentrating and drying said extraction fluid.

7. The method of claim 1, wherein the step of extraction is carried out in an extraction apparatus, wherein said extraction apparatus comprises: an extracting can comprising a can body and a top lid, a sealing structure to seal the can body and the top lid, a water supply system and a pipeline connection to input water into the can body from the water-supply system and to output the extraction fluid; said apparatus further comprising a high pressure pump, which is connected to the extracting can to maintain the pressure in the extracting can at 25-35 MPa; said apparatus further comprising a raw material can and a nonlinear vibration apparatus to emit nonlinear vibration with a frequency in the range of 18 KHz-33 KHz, wherein the raw material can and nonlinear vibration apparatus are set inside the extracting can; wherein said top lid is equipped with both a connecting hole to pass therethrough a conductive line for connecting said nonlinear vibration apparatus to an external electrical source and a vent hole connected to a seal valve; said apparatus further comprising a material pump connected to the extracting can to output the extraction fluid.

8. The method of claim 7, wherein said nonlinear vibration apparatus comprises a plurality of vibration apparatuses emitting nonlinear vibration, with the axes of the adjacent nonlinear vibration apparatus perpendicular in different surfaces with each other, wherein said nonlinear vibration apparatus has two proximate ends with outputting curve surface and a vibrating slice set between the two proximate ends, and an insulation layer set outside of the vibrating slice, and a conducting line connecting the vibrating slice with the external electrical source.

9. The method of claim 7, wherein said raw material can is a cylindrical bracket enwrapped with a filter cloth bag, and the apparatus further comprises a hook set in the center of the bracket top to hang the nonlinear vibration apparatus.

10. The method of claim 7, wherein said sealing structure is a collar and a seal washer between the can body and the top lid, wherein said can body is also comprises an external circulating pump to circulate fluid in the extracting can.

11. The method of claim 7, wherein the extracting can is further equipped with an external temperature-controlling apparatus capable of maintaining the temperature in the range of 20° C.-50° C.

12. The method of claim 11, wherein said temperature-controlling apparatus comprises a heating-and-warming layer.

13. The method of claim 7, wherein said water-supplying system has a water-processing machine and a water pump to input fluid into the extracting can.

14. The method of claim 10, wherein said circulating pump is a magnetic circulating pump.

15. The method of claim 7, wherein the sealing valve is further connected to an air compressor.

16. The method of claim 7, wherein said apparatus further comprises a concentrating system connected to the material fluid can.

17. The method of claim 16, wherein said concentrating system comprises a supersonic atomization apparatus comprising an air-filtrating machine set on the top of said concentrating system, an atomization room, a gas-gathering room and gas-outputting fan set under the atomization room, wherein there is a plurality of supersonic generators set in the atomization room, and a fluid-inputting hole inputting the extraction fluid and fluid-outputting hole outputting the concentrated extraction fluid set on the side wall of the atomization room.

18. The method of claim 1, wherein the plant is Angelica.

* * * * *